Sept. 20, 1938.  R. E. MACKAHAN ET AL  2,130,692
EYEGLASS
Filed Sept. 28, 1934  2 Sheets-Sheet 1
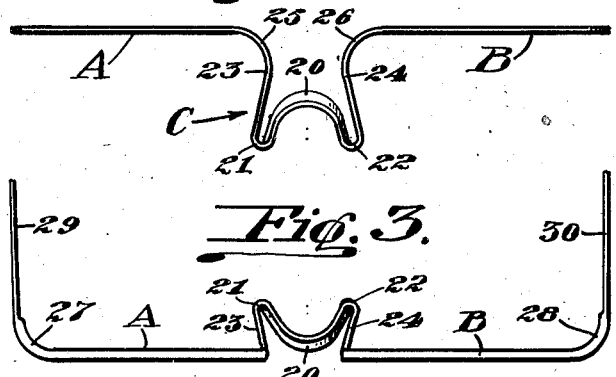
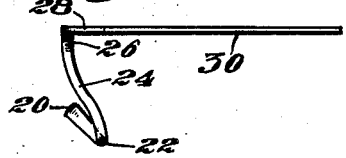
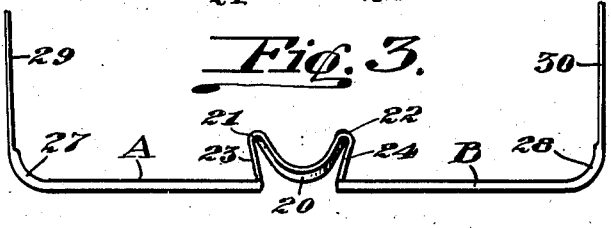
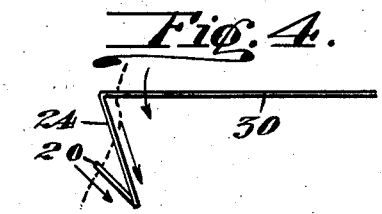
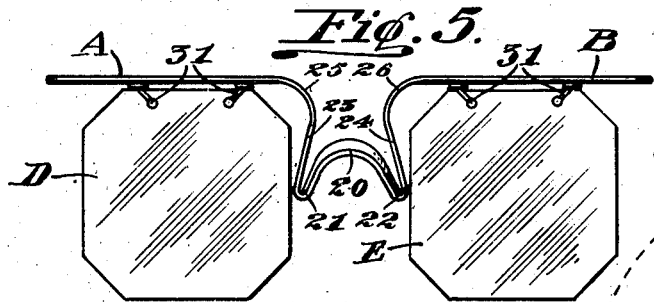
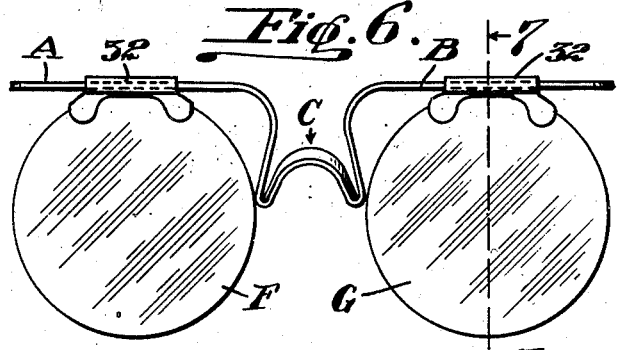
Inventors:
RUFUS EDWARD MACKAHAN AND
MERRILL W. HARD:
BY R. S. Berry
Attorney Sept. 20, 1938.  R. E. MACKAHAN ET AL  2,130,692
EYEGLASS
Filed Sept. 28, 1934  2 Sheets-Sheet 2
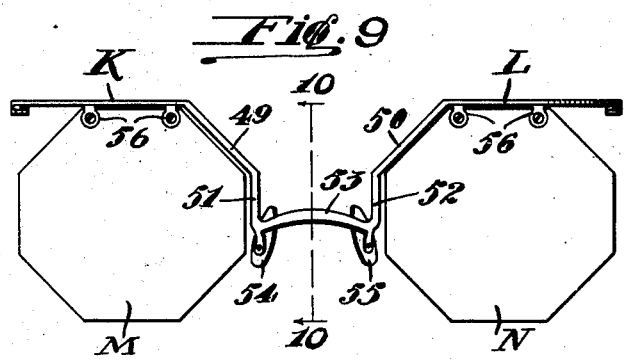
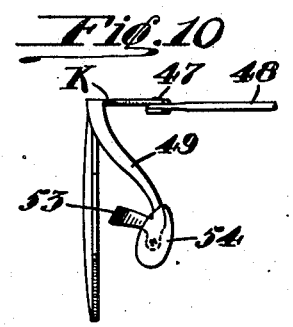
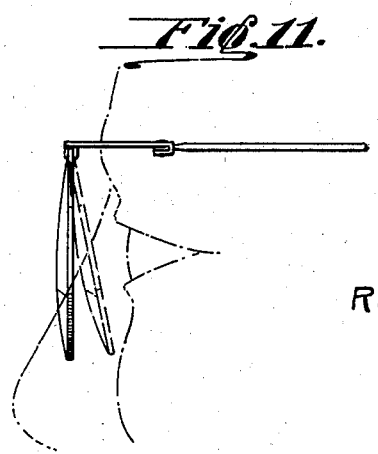
Inventors:
RUFUS EDWARD MACKAHAN AND
MERRILL W. HARD
By Patented Sept. 20, 1938

2,130,692

UNITED STATES PATENT OFFICE 2,130,692

EYEGLASS

Rufus Edward Mackahan, West Hollywood, and Merrill W. Hard, Los Angeles, Calif.

Application September 28, 1934, Serial No. 745,954

2 Claims. (Cl. 88—47)

This invention relates to eye glass frames and more particularly pertains to a supporting frame for eye glass lenses.

An object of the invention is to provide a supporting frame for eye glass lenses in which the lenses may be mounted to hang or depend from the frame independent of the nose engaging members and ear engaging bows of the frame so as to minimize stress or strains imposed on the lenses while being worn and also during handling of the eye glasses as in applying and removing same.

Another object is to provide a supporting frame for eye glasses in which the direction of forces developed by the weight of the lenses and their support will be such as to tend to retain the eye glasses in place on the face of the wearer and whereby a nose engaging member will tend to remain seated on the nose in a state of equilibrium and whereby maintaining the glasses in place is readily effected without unduly pinching or gripping the nose.

Another object is to provide an eye glass lens supporting frame embodying a nose engaging member carried by oppositely extending aligned bars from which the eye glass lenses are suspended, and in which the bars afford a means for supporting a pair of eye glass lenses in various spaced relations to each other whereby the lenses may be adjusted on the frame to accommodate them to various spacings of eye centers.

Another object is to provide an eye glass frame which is so formed that it may be disposed on the face of the wearer so as to be outside of the range of vision especially as to the points of connection of the ear engaging bows with the ends of the bars so as to afford no obstruction to the vision.

With the foregoing objects in view, together with such other objects and advantages as may subsequently appear, the invention resides in the parts and in the combination, construction and arrangement of parts hereinafter described and claimed and illustrated by way of example in the accompanying drawings in which:

Fig. 1 is a view in front elevation of the eye glass lens support;

Fig. 2 is a view of the support as seen in end elevation;

Fig. 3 is a plan view of the support shown in Fig. 1;

Fig. 4 is a diagram illustrating the direction of forces resulting from the formation of the support in accordance with the invention whereby the support is caused to be stabilized when worn;

Fig 5 is a view in front elevation showing the support as fitted with a pair of lenses;

Fig. 6 is a view showing the support as employed as a frame for adjustable lenses or shields as in the construction of goggles;

Fig. 7 is a detail in section taken on the line 7—7 of Fig. 6 showing the manner of adjusting the shield on the frame;

Fig. 8 is a perspective view illustrating the eye glasses as applied;

Fig. 9 is a view in front elevation illustrating another modified form of the eye glass;

Fig. 10 is a detail in vertical section and elevation taken on the line 10—10 of Fig. 9;

Fig. 11 is a view in side elevation showing the eye glass frame as applied and illustrating the manner in which the frame is disposed so as not to interfere with the vision.

In the form of the invention shown in Figs. 1 to 8 inclusive the eye glass supporting frame embodies a pair of aligned horizontally extending members A and B which are connected together by a nose engaging member C; the latter embodying an upwardly and forwardly inclined arch member 20 the lower end portion of which connects through reverse bends 21 and 22 with upwardly and forwardly extending and inwardly inclined supporting members 23 and 24 which merge into the adjacent ends of the horizontal members A and B through curved portions 25 and 26. The members 23 and 24 incline rearwardly at an angle to the vertical less than the angle of inclination of the arch member 20, as particularly shown in Fig. 2, and incline toward each other to their intersection with the curved portions 25 and 26. The outer end portions of the horizontal members A and B are curved rearwardly as indicated at 27 and 28 and are connected with ear engaging bows 29 and 30 in a suitable manner.

The arched member 20 is spaced below the plane of the bars A and B such distance that when it is positioned astride the nose as indicated in Fig. 4 the plane of the bars A and B will be approximately at or above the eye brows.

A pair of eye glass lenses D and E are mounted on the bars A and B and are connected thereto in any suitable fashion to depend therefrom as shown in Fig. 5. The lenses D and E are each fitted with a pair of hangers 31 which are connected to the upper margins of the lenses D and E and are affixed as by soldering to the under sides of the members A and B.

In the construction shown in Fig. 6 a pair of lenses F and G are affixed to sleeves 32 which slidably encircle the members A and B in frictional engagement therewith whereby the lenses may be shifted longitudinally of the members A and B to vary the spacings relative to each other and whereby the lenses may be disposed at various positions around the axis of the members A and B while the supporting frame is being worn so that the lenses may be disposed in a dependent position as indicated in full lines in Fig. 7 to project in front of the eyes, or may be inclined as indicated in dotted lines a in Fig. 7 to form an eye shield, or may be disposed to project upwardly from the supporting frame as indicated by the dotted lines b so as to be placed clear of the eyes when their use is not desired, so as to avoid removal of the frames.

The constructions shown in Figs. 6 and 7 is especially applicable for use in goggles and the like.

In the construction shown in Figs. 9 and 10 the eye-glass frame embodies a pair of spaced longitudinal aligned lens supporting bars K and L the outer end portions of which are bent rearwardly and are connected by pivots 47 to ear engaging bows 48. The inner end portions of the bars K and L connect with downwardly and rearwardly inclined members 49 and 50 which terminate in downwardly extending members 51 and 52 connected together at their lower ends by a bridge 53 adapted to span the nose. Pads 54 and 55 are provided at the ends of the bridge 53 and are adapted to seat on the sides of the nose at points on a plane rearward of the vertical plane of the bars K and L.

Eye-glass lenses M and N are depended from the bars K and L by hangers 56.

An important feature of the invention resulting from the constructions and arrangements set forth is that the lens supporting bars being located to extend close to the eye-brows are out of the range of vision and also that the end connections thereof with the ear engaging bows are disposed above and to the rear of the eyes, as shown in Fig. 11, thus disposing such members and the connections out of the range of vision.

It will be seen that the eye-glass frame formed as herein set forth may be readily fitted to the face of the wearer and that the lenses may be readily positioned on the frames to dispose them in proper relation to the eyes of the person for whom the glasses are designed.

We claim:

1. A frame for rimless eye-glasses comprising an upwardly and forwardly inclined arched nose engaging member, supporting members leading upwardly and forwardly from the ends of said arched member in continuation thereof having their upper portions projecting above said arched member, out-turned arcuate portions in continuation of said supporting members extending laterally away from each other, a straight horizontal lens supporting bar leading from the out-turned arcuate portions in continuation thereof and carried solely thereby, said bars being disposed in alignment with each other and terminating at their outer ends in rearwardly curved portions, ear engaging bows connected to the ends of said curved portions, and means on each of said bars for engaging the upper marginal portion of an eye glass lens and for holding the lens in a dependent position from the bar in spaced relation thereto; said arcuate portions being arranged to extend in spaced relation to the edges of lenses depending from the bars.

2. In a frame for rimless eye glasses, an arched nose engaging member, supporting members leading upwardly from the ends of said arched member, arcuate portions formed in continuation of said supporting members, aligned horizontal lens supporting bars leading from said arcuate portions in continuation thereof, ear engaging bows connected to said bars, and means for supporting eye glass lenses on said bars to depend therefrom in spaced relation thereto; said arcuate portions extending in spaced relation to lenses on said supporting means.

RUFUS EDWARD MACKAHAN.
MERRILL W. HARD.